(12) United States Patent
Roffe et al.

(10) Patent No.: US 10,697,497 B1
(45) Date of Patent: Jun. 30, 2020

(54) TWO-PIECE BEARING CAGE

(71) Applicant: Schaeffler Technologies AG & Co. KG, Herzogenaurach (DE)

(72) Inventors: Dennis Roffe, Fort Mill, SC (US); Michael Heaton, Rock Hill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/568,427

(22) Filed: Sep. 12, 2019

(51) Int. Cl.
*F16C 33/41* (2006.01)
*F16C 33/38* (2006.01)

(52) U.S. Cl.
CPC ...... *F16C 33/3856* (2013.01); *F16C 33/3887* (2013.01)

(58) Field of Classification Search
CPC .. F16C 33/3831; F16C 33/3856; F16C 33/41; F16C 33/412; F16C 33/414; F16C 33/416; F16C 33/418
See application file for complete search history.

(56) References Cited

U.S. PATENT DOCUMENTS

| | | | |
|---|---|---|---|
| 2,038,095 A * | 4/1936 | Bott | F16C 33/3831 384/527 |
| 4,572,678 A | 2/1986 | Neder et al. | |
| 5,131,762 A | 7/1992 | Waskiewicz | |
| 5,749,661 A | 5/1998 | Rainer | |
| 6,416,230 B1 | 7/2002 | Staudigel et al. | |
| 6,565,259 B2 * | 5/2003 | Hoya | F16C 33/38 384/527 |
| 8,303,192 B2 * | 11/2012 | Yamada | F16C 33/418 384/576 |
| 10,527,095 B1 * | 1/2020 | Roffe | F16C 33/3831 |
| 2015/0337901 A1 * | 11/2015 | Hayashi | F16C 33/4635 384/527 |

FOREIGN PATENT DOCUMENTS

| | | | | |
|---|---|---|---|---|
| JP | H068821 U | * | 2/1994 | ......... F16C 33/3831 |
| JP | 2007298160 A | * | 11/2007 | ......... F16C 33/6696 |

* cited by examiner

*Primary Examiner* — Phillip A Johnson
(74) *Attorney, Agent, or Firm* — Reid A. Baldwin

(57) ABSTRACT

A hybrid bearing cage, suitable for high-speed applications, includes a plastic ring and a metal stiffener. Rollers, such as balls, are retained in roller retainers in the plastic ring. The roller retainers are joined by links. The metal stiffener has an annular portion and a plurality of radial extensions that extend over the links, reducing deflection and stress concentrations in the plastic ring due to centrifugal forces.

16 Claims, 2 Drawing Sheets

TWO-PIECE BEARING CAGE

TECHNICAL FIELD

The disclosure concerns a bearing cage for a high-speed application. More particularly, the disclosure concerns a ball-bearing cage with a metal stiffener.

BACKGROUND

Roller bearings, such as ball bearings, are used to reduce friction between components that are intended to have relative rotation. A set of rollers separate an inner ring from an outer ring. Relative rotation of the inner ring and outer ring causes rolling contact, as opposed to sliding contact, between the roller and the inner ring and between the rollers and the outer ring. Substantial radial forces may be transferred through the rollers with minimal drag torque.

In some roller bearings, the rollers are circumferentially positioned relative to one another by a bearing cage. The bearing cage rotates at a speed approximately equal to an average of the speeds of the inner ring and the outer ring.

SUMMARY

A high-speed bearing cage includes a plastic ring and a metal stiffener. An outer radius of the plastic ring may be equal to an outer radius of the metal stiffener. The plastic ring has a plurality of roller retainers separated by a plurality of links. Each roller retainer is configured to retain a roller. The roller retainers have a first radial thickness. The links have a second radial thickness less than the first radial thickness. The metal stiffener has an annular portion and a plurality of axial projections. The annular portion may be adjacent to a closed side of the roller retainers. Each axial projection extends between adjacent roller retainers radially outside and in contact with a corresponding link. At least one of the axial projections may have a tab on an end opposite the annular portion which snaps over the corresponding link to secure the metal stiffener to the plastic ring. A high-speed bearing includes the high speed bearing cage and at least one roller retained by at least one of the roller retainers. The at least one roller may include at least one ball.

A method of assembling a high-speed bearing includes providing a plastic ring, inserting at least one roller, and attaching a metal stiffener to the plastic ring. The plastic ring has a plurality of roller retainers separated by a plurality of links. Each roller retainer is configured to retain a roller, such as a ball. The roller retainers have a first radial thickness. The links have a second radial thickness less than the first radial thickness. The metal stiffener has an annular portion and a plurality of axial projections. Each axial projection is inserted between adjacent roller retainers radially outside and in contact with a corresponding link. At least one of the axial projections may have a tab on an end opposite the annular portion which snaps over the corresponding link to secure the metal stiffener to the plastic ring.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
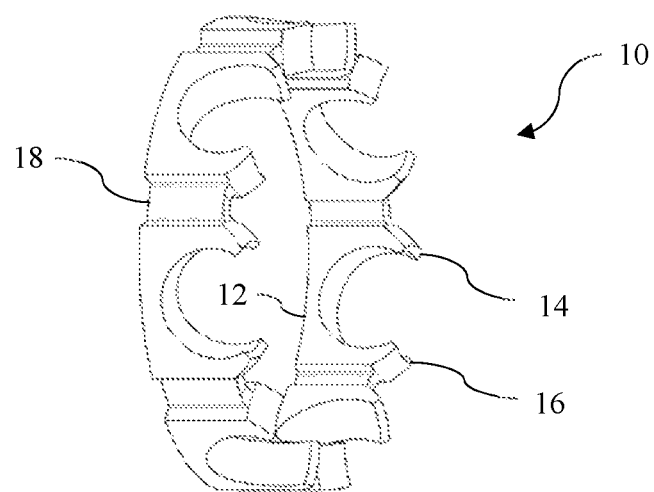
FIG. 1 is a pictorial view of a plastic ring of a bearing cage.

FIG. 1 illustrates a plastic ball bearing cage 10. Plastic bearing cages may include a number of roller retainers 12 equal to the number of rollers (seven in the example of FIG. 1, although the number varies). Each roller retainer may include two arms 14 and 16 which form a pocket and conform to the shape of the sides of the roller. In this case, the arms are joined on a closed side and not joined on an open side. To facilitate assembly of the roller bearing, it is preferable for the rollers to be held in the cage without having the inner ring and outer rings in place. As the rollers are inserted into the roller retainers, the roller retainers must flex elastically. To ensure sufficient flexibility of the roller retainers, the plastic between the roller retainers, called links 18, may be radially thinner than the roller retainers themselves.

In operation, the bearing cage rotates at an average speed of the inner and outer rings. When the cage rotates, centrifugal forces cause stress in the material. At high rotational speeds, especially for larger diameter bearings, stress concentrations at the interfaces between the links and the roller retainers may lead to cracks and eventual bearing failure.

Figure 2:
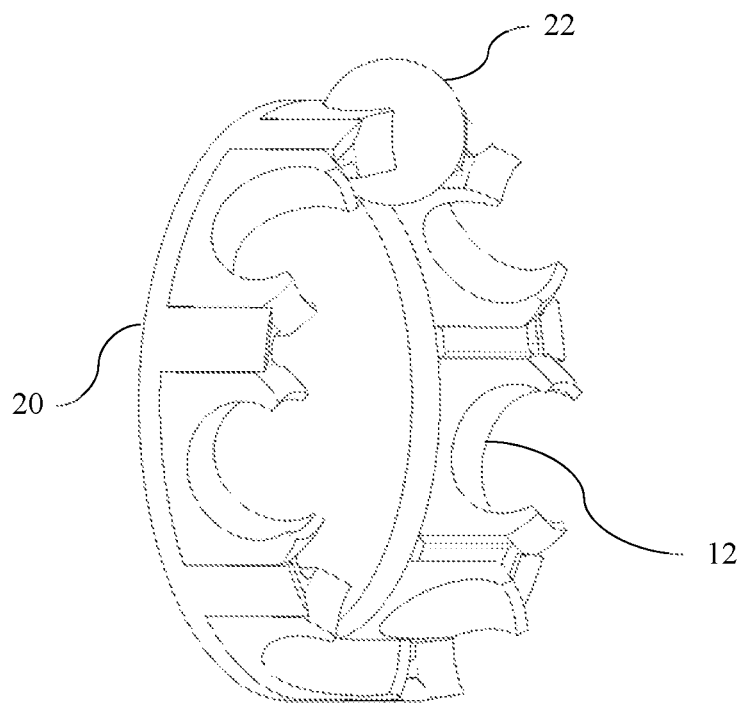
FIG. 2 is a pictorial view of a bearing cage including the plastic ring of FIG. 1 and a metal stiffener.
Figure 3:
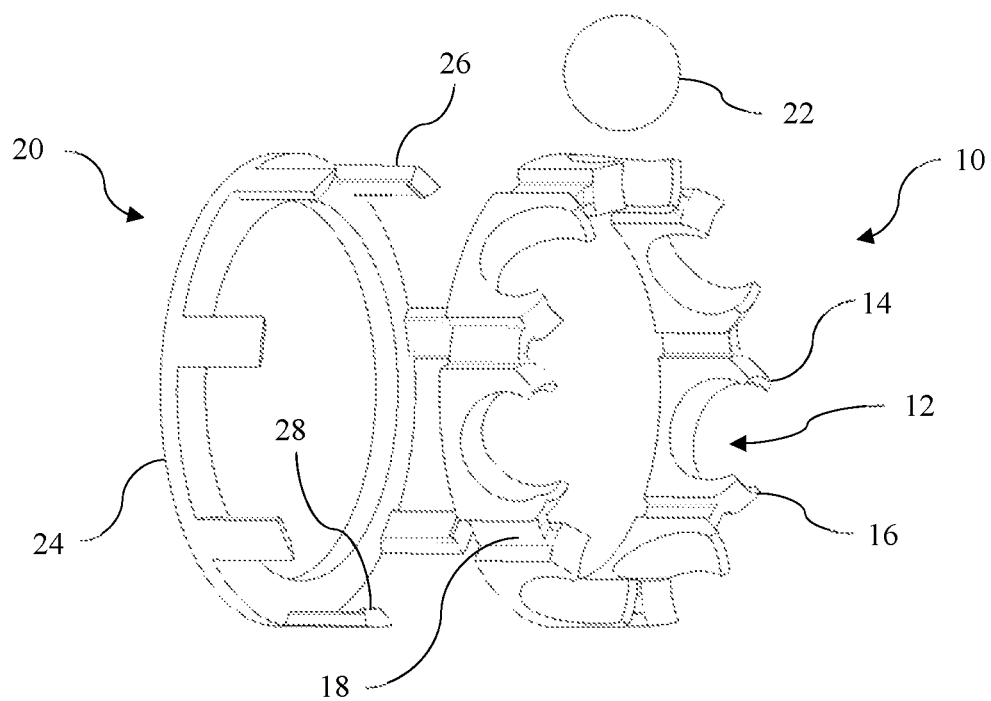
FIG. 3 is an exploded view of the bearing cage of FIG. 2 illustrating the assembly process.
Figure 4:
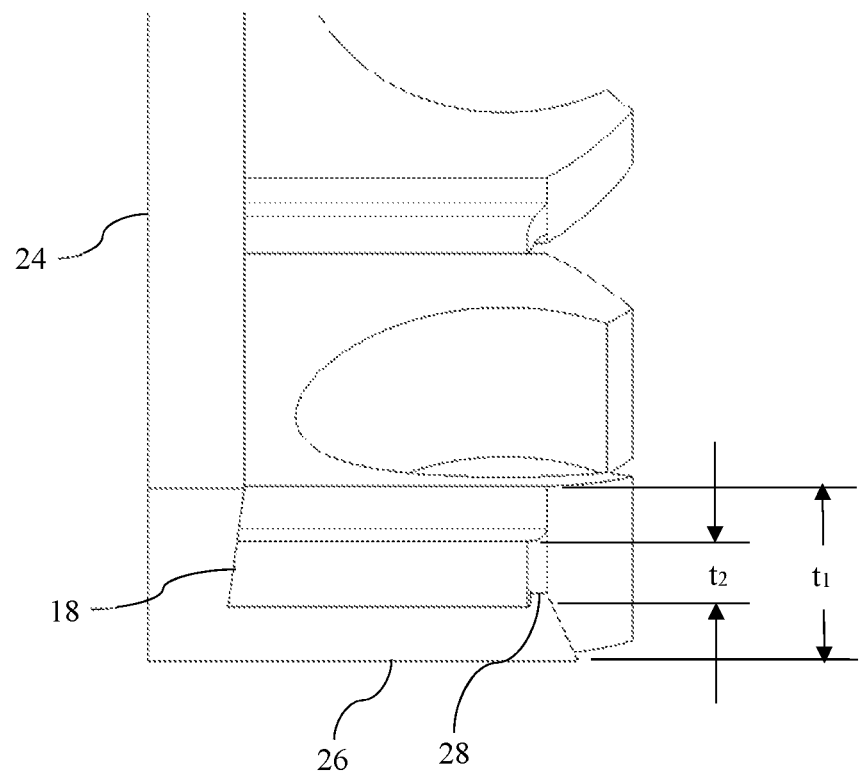
FIG. 4 is a cut-away view of a portion of the bearing cage of FIG. 2.

FIG. 2 shows a hybrid bearing cage for high speed applications. A metal stiffener is added that redistributes stress from centrifugal forces to preclude stress concentrations and cracks. In FIG. 2, one of the seven rollers in shown in the installed position. FIG. 3 is an exploded view illustrating how the cage of FIG. 2 is assembled. Metal stiffener 20 includes an annual portion 24 with a plurality of axial projections 26. The number of axial projections is equal to the number of roller retainers and therefore also equal to the number of links. The inner radius of the majority of the axial projection is substantially equal to the outer radius of the links such that the axial projections constrain the links from flexing outward. At least some of the axial projections have a tab 28 on the end opposite the annular portion. This tab snaps over a corresponding link to lock the metal stiffener in place axially. FIG. 4 illustrates this snap-fit feature. FIG. 4 also illustrates the relative radial thicknesses of the roller retainers, $t_1$, and the links $t_2$.

The cage and roller assembly of the high-speed bearing are assembled as follows. First, the plastic ring that includes the roller retainers and the links is fabricated from plastic. For example, the ring may be injection molded. Then, the stiffener is fabricated from metal by, for example, stamping and/or machining. The rollers, balls in this example, are inserted into the roller retainers. Finally, the stiffener is attached by inserting the axial projections over the links, and snapped into place. By inserting the balls prior to attaching the stiffener, the arms are flexible enough to allow easy insertion. In use, the stiffener makes the arms rigid enough to retain the rollers and avoid stress cracks even at high rotational speeds.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A high-speed bearing cage comprising:
    a plastic ring having a plurality of roller retainers separated by a plurality of links, each roller retainer configured to retain a roller, the roller retainers having a first radial thickness, the links having a second radial thickness less than the first radial thickness; and
    a metal stiffener having an annular portion and a plurality of axial projections, each axial projection extending between adjacent roller retainers radially outside and in contact with a corresponding link.

2. The high-speed bearing cage of claim 1 wherein the roller is a ball.

3. The high-speed bearing cage of claim 1 wherein at least one of the axial projections have a tab on an end opposite the annular portion and the tab snaps over the corresponding link to secure the metal stiffener to the plastic ring.

4. The high-speed bearing cage of claim 1 wherein the annular portion is adjacent to a closed side of the roller retainers.

5. The high-speed bearing cage of claim 1 wherein an outer radius of the plastic ring is equal to an outer radius of the metal stiffener.

6. A high-speed bearing comprising:
    a plastic ring having a plurality of roller retainers separated by a plurality of links, the roller retainers having a first radial thickness, the links having a second radial thickness less than the first radial thickness;
    a metal stiffener having an annular portion and a plurality of axial projections, each axial projection extending between adjacent roller retainers radially outside and in contact with a corresponding link; and
    at least one roller retained by at least one of the roller retainers.

7. The high-speed bearing of claim 6 wherein the at least one roller includes at least one ball.

8. The high-speed bearing of claim 6 wherein at least one of the axial projections have a tab on an end opposite the annular portion and the tab snaps over the corresponding link to secure the metal stiffener to the plastic ring.

9. The high-speed bearing of claim 6 wherein the annular portion is adjacent to a closed side of the roller retainers.

10. The high-speed bearing of claim 6 wherein an outer radius of the plastic ring is equal to an outer radius of the metal stiffener.

11. A method of assembling a high-speed bearing comprising:
    providing a plastic ring having a plurality of roller retainers separated by a plurality of links, each roller retainer configured to retain a roller, the roller retainers having a first radial thickness, the links having a second radial thickness less than the first radial thickness;
    inserting at least one roller into at least one of the roller retainers; and
    attaching a metal stiffener to the plastic ring, the metal stiffener having an annular portion and a plurality of axial projections, each axial projection inserted between adjacent roller retainers radially outside and in contact with a corresponding link.

12. The method of claim 11 wherein the at least one roller is a ball.

13. The method of claim 11 wherein at least one of the axial projections have a tab on an end opposite the annular portion and the tab snaps over the corresponding link to secure the metal stiffener to the plastic ring.

14. The method of claim 11 wherein the metal stiffener is attached such that the annular portion is adjacent to a closed side of the roller retainers.

15. The method of claim 11 wherein an outer radius of the plastic ring is equal to an outer radius of the metal stiffener.

16. The method of claim 11 wherein the at least one roller is inserted before the metal stiffener is attached.

\* \* \* \* \*